United States Patent
Yoon

(10) Patent No.: US 9,689,487 B2
(45) Date of Patent: Jun. 27, 2017

(54) ROLL MOUNT USING MAGNETORHEOLOGICAL FLUID

(71) Applicant: Hyundai Motor Company, Seoul (KR)

(72) Inventor: Hyoung-Jin Yoon, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/863,229

(22) Filed: Sep. 23, 2015

(65) Prior Publication Data

US 2016/0273642 A1    Sep. 22, 2016

(30) Foreign Application Priority Data

Mar. 17, 2015  (KR) .................. 10-2015-0036515

(51) Int. Cl.
| | | |
|---|---|---|
| *F16F 9/53* | (2006.01) | |
| *F16H 57/028* | (2012.01) | |
| *F16H 57/021* | (2012.01) | |

(52) U.S. Cl.
CPC ......... *F16H 57/028* (2013.01); *F16H 57/021* (2013.01)

(58) Field of Classification Search
USPC ....... 248/550, 562, 565, 566, 579, 596, 597, 248/605, 606, 607, 608, 609, 626, 636, 248/638; 188/267.2, 290, 306, 130
See application file for complete search history.

(56) References Cited

U.S. PATENT DOCUMENTS

| | | | | |
|---|---|---|---|---|
| 2,635,483 A | * | 4/1953 | Welsh ..................... | F16F 15/18 192/21.5 |
| 4,687,171 A | * | 8/1987 | Freudenberg ........... | F16F 13/26 248/636 |
| 5,820,113 A | * | 10/1998 | Laughlin ................. | F16F 13/26 188/267 |
| 6,076,794 A | * | 6/2000 | Pradel .................. | B60G 13/003 248/636 |
| 6,318,522 B1 | * | 11/2001 | Johnston ................ | B60G 3/202 188/267.2 |
| 6,471,018 B1 | * | 10/2002 | Gordaninejad ......... | F16F 9/535 188/267.1 |

(Continued)

FOREIGN PATENT DOCUMENTS

| | | |
|---|---|---|
| JP | 5-8624 A | 1/1993 |
| JP | 5-321975 A | 12/1993 |

(Continued)

*Primary Examiner* — Terrell McKinnon
*Assistant Examiner* — Michael McDuffie
(74) *Attorney, Agent, or Firm* — Morgan Lewis & Bockius LLP

(57) ABSTRACT

A roll mount using a magnetorheological fluid may include a bracket which has a mounting portion having a pipe shape, an insulator made of an elastic material and fitted into the mounting portion, the insulator having therein two liquid chambers that are in communication with each other through flow paths and having a core coupled to a center thereof, and a coil which is wound around an outside of the insulator, in which a magnetorheological fluid is encapsulated in the liquid chambers, the magnetorheological fluid flows while the insulator is elastically deformed by a load applied to the core, and a flow rate of the magnetorheological fluid is adjusted depending on an amount of electric current applied to the coil.

6 Claims, 6 Drawing Sheets

(56) References Cited

U.S. PATENT DOCUMENTS

| | | | |
|---|---|---|---|
| 6,681,905 B2 | 1/2004 | Edmondson et al. | |
| 7,051,849 B2* | 5/2006 | Browne | F16F 9/535 |
| | | | 188/266.4 |
| 7,364,022 B2* | 4/2008 | Gordaninejad | F16F 9/537 |
| | | | 188/267 |
| 7,637,360 B2* | 12/2009 | Carlson | A47C 1/03 |
| | | | 188/267.2 |
| 8,397,885 B2* | 3/2013 | Shiao | F16F 9/12 |
| | | | 188/164 |
| 2001/0032919 A1* | 10/2001 | Hagino | F16F 13/264 |
| | | | 248/562 |
| 2010/0300819 A1* | 12/2010 | Hiemenz | F16F 9/537 |
| | | | 188/267.2 |
| 2011/0114421 A1* | 5/2011 | Piech | B66B 1/32 |
| | | | 187/276 |
| 2014/0124645 A1* | 5/2014 | Satou | F16F 1/3849 |
| | | | 248/638 |
| 2014/0152066 A1* | 6/2014 | Hiemenz | F16F 9/535 |
| | | | 297/344.1 |

FOREIGN PATENT DOCUMENTS

| | | |
|---|---|---|
| JP | 2006-97788 A | 4/2006 |
| JP | 2010-139042 A | 6/2010 |
| JP | 2013-32834 A | 2/2013 |
| KR | 10-2006-0094677 A | 8/2006 |
| KR | 10-0887976 B1 | 3/2009 |

* cited by examiner

ROLL MOUNT USING MAGNETORHEOLOGICAL FLUID

CROSS-REFERENCE TO RELATED APPLICATION

The present application claims priority to Korean Patent Application No. 10-2015-0036515, filed Mar. 17, 2015, the entire contents of which is incorporated herein for all purposes by this reference.

BACKGROUND OF THE INVENTION

Field of the Invention

The present invention relates to a roll mount that is fixedly mounted to a vehicle body and supports behavior of a powertrain, and more particularly, to a roll mount using a magnetorheological fluid (MRF), which is capable of controlling properties thereof depending on a traveling condition of a vehicle by using the magnetorheological fluid having flow properties that vary as a magnetic field is formed.

Description of Related Art

In a passenger vehicle, a powertrain, which is configured by coupling an engine and a transmission, is generally mounted by a four-point mounting method (which supports behavior of the powertrain at four points) or by a three-point mounting method (which supports behavior of the powertrain at three points) depending on a size and an arrangement of the power train.

Meanwhile, high-performance vehicles, which are designed in a midship type (in which the powertrain is disposed at a center or at a rear side of a vehicle body) in order to distribute a weight of the vehicle in front and rear directions, adopt the four-point mounting method as illustrated in FIG. 1A so as to more securely support the behavior of the powertrain.

In the four-point mounting method, an engine mount 7 and a transmission (TM) mount 8 are disposed at both sides of a powertrain 6 to support a load, and roll mounts 1 are connected to a lower side of the powertrain 6 at front and rear sides of a drive shaft 9 that transmits rotational force of an engine to wheels, thereby supporting rolling motion of the powertrain 6.

That is, the engine mount 7 and the TM mount 8 are disposed at both sides of the powertrain 6, respectively, to support a load of the powertrain 6, and the roll mounts 1, which are attached at the lower side of the powertrain 6, are additionally connected with the powertrain 6, such that the roll mounts 1 share the functions of controlling displacement and attenuating vibration with the engine mount 7 and the TM mount 8.

As illustrated in FIG. 1B, the roll mount 1 in the related art has a structure in which a bracket 3 with a mounting portion 2 having a pipe shape is fixedly fastened to the vehicle body by bolting, and an insulator 5 made of an elastic material is mounted on the mounting portion 2. A core 4, which is coupled to the powertrain 6, is coupled at a center of the insulator 5, and recessed grooves 5a are formed at upper and lower sides of the core 4, respectively, to allow up and down vibration of the insulator 5 to more easily occur.

Meanwhile, as properties of the insulator 5 of the roll rod 1 are increased (as the insulator 5 becomes harder), traveling performance becomes better because a roll angle of the powertrain 6 is decreased. However, as properties of the insulator 5 are decreased (as the insulator 5 is greatly elastically deformed), noise, vibration, and harshness (NVH) performance is improved because the insulator 5 is advantageous in insulating vibration when the vehicle is idling.

Therefore, in the case of the high-performance vehicle with the structure in the related art, the properties of the insulator 5 are set while placing emphasis on the traveling performance rather than the NVH performance, and as a result, there is a problem in that the NVH performance deteriorates in inverse proportion to the traveling performance.

Therefore, there is a need for a roll mount capable of maintaining low properties thereof when the vehicle is idling, and increasing properties thereof according to a traveling condition when the vehicle starts moving or travels.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a roll mount using a magnetorheological fluid, which is capable of improving traveling performance by increasing properties of the roll mount by using the magnetorheological fluid as necessary when a vehicle starts moving or travels, and capable of improving NVH performance by decreasing properties of the roll mount when the vehicle is idling.

According to various aspects of the present invention, a roll mount using a magnetorheological fluid may include a bracket which has a mounting portion having a pipe shape, an insulator made of an elastic material and fitted into the mounting portion, the insulator having therein two liquid chambers that are in communication with each other through flow paths and having a core coupled to a center thereof, and a coil which is wound around an outside of the insulator, in which a magnetorheological fluid is encapsulated in the liquid chambers, the magnetorheological fluid flows while the insulator is elastically deformed by a load applied to the core, and a flow rate of the magnetorheological fluid may be adjusted depending on an amount of electric current applied to the coil.

The insulator may be fitted into a metallic housing and mounted on the bracket, and the coil may be wound around an outer circumferential surface of the housing.

The liquid chambers may be positioned at both sides of the core interposed therebetween.

A groove may be formed in the housing so that one or more strands of the wound coil are taken out toward one side.

The liquid chambers may be positioned at both sides of the core interposed therebetween.

The flow paths may be formed at both sides along a circumference of an inner circumferential surface of the insulator between the liquid chambers.

According to the present invention having the aforementioned configuration, flow properties of the magnetorheological fluid vary as electric power is applied, such that it is possible to improve NVH performance when a vehicle is idling, and to improve traveling performance when the vehicle starts moving or travels.

Since the insulator is coupled to the metallic housing by being fitted into the housing, the assembling may be easily carried out, and the insulator may also be mounted to a bracket in the related art.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
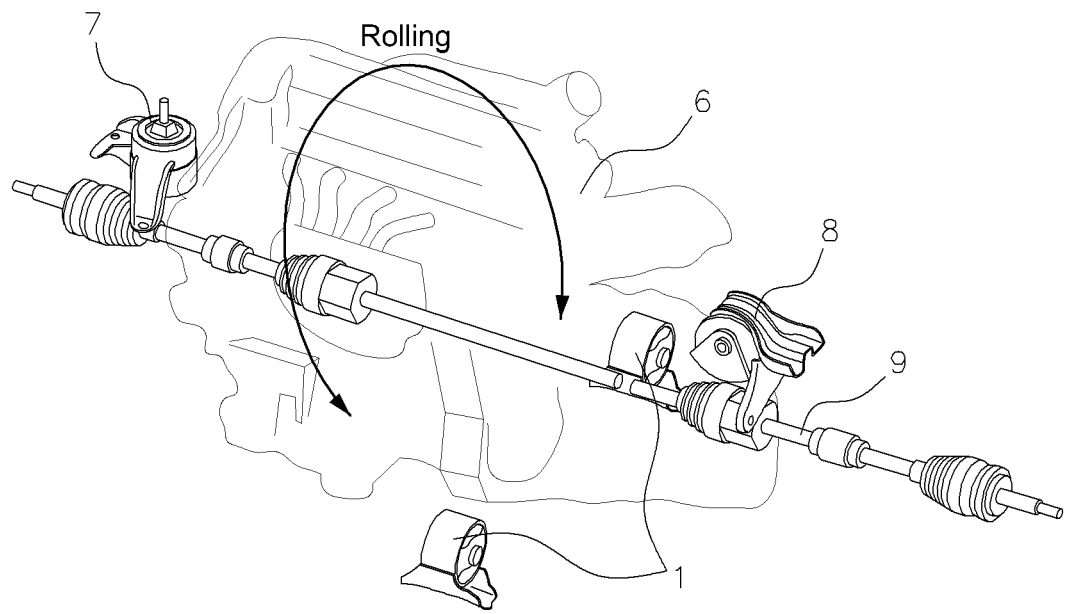
FIG. 1A is a view illustrating a position at which a roll mount is mounted to support behavior of a powertrain according to the related art.
Figure 1B:
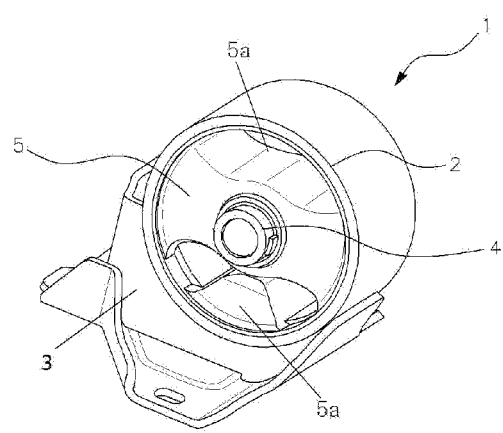
FIG. 1B is a view illustrating a roll mount of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A roll mount 100 of the present invention has a structure in which an insulator 20 is coupled to a housing 30 and mounted on a mounting portion 11 of a bracket 10, a predetermined amount of magnetorheological fluid is encapsulated in two liquid chambers 23a and 23b formed in the insulator 20 so as to be able to flow through flow paths 24a and 24b, and a coil 40 is wound around an outer circumferential surface of the housing 30.

The magnetorheological fluid is a suspension in which (nanoscale) particles having magnetism are mixed with a synthetic hydrocarbon liquid, and has characteristics in that a shear stress thereof varies depending on intensity of a magnetic field at the periphery. That is, the magnetic field is generated depending on an amount of electric current that is applied to the coil 40, and the shear stress of the magnetorheological fluid is increased or decreased (a flow is allowed or restricted) according to the intensity of the magnetic field, such that damping characteristics of the insulator 20 are controlled.

Figure 2:
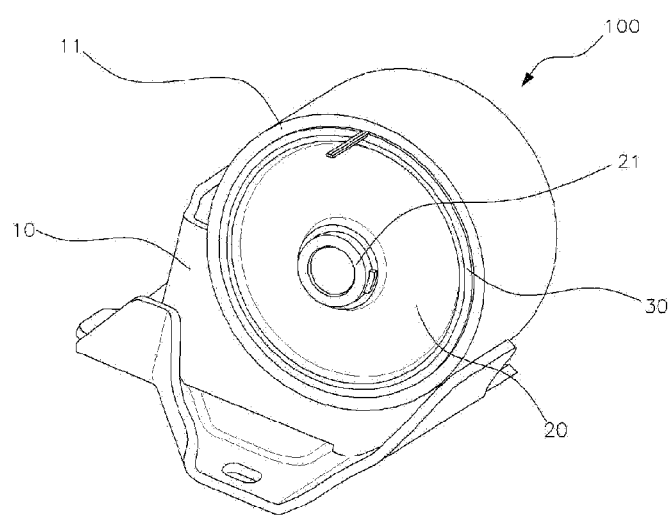
FIG. 2 is a view illustrating an exemplary roll mount according to the present invention.

As illustrated in FIG. 2, the roll mount 100 of the present invention is mounted on the bracket 10 with the mounting portion 11 having a pipe shape in a state in which the insulator 20 and the housing 30 are coupled.

The core 21, which is fastened to the powertrain by bolting, is inserted into a mold in a state in which the core 21 is disposed at a center of a frame 22 that has a pipe shape and maintains a shape of the insulator 20, and rubber is vulcanized into the mold and then hardened, such that the insulator 20 is formed.

Figure 3A:
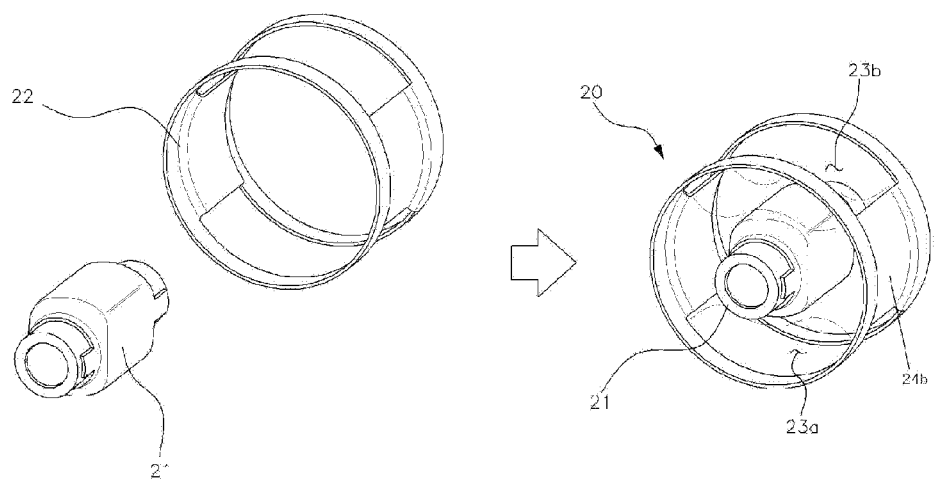
FIG. 3A is a view illustrating an appearance before rubber is vulcanized on a frame and a core, and an appearance in which an insulator is manufactured by vulcanizing rubber integrally on the frame and the core.

As illustrated in FIG. 3A, the liquid chambers 23a and 23b, which have a shape in which an outer circumferential surface is recessed to a predetermined depth, are formed at upper and lower sides of the core 21 of the insulator 20 so that the magnetorheological fluid may be encapsulated in the liquid chambers 23a and 23b, and the flow paths 24a and 24b (see FIG. 5) are formed at both sides of the core 21 so that the magnetorheological fluid may flow between the liquid chambers 23a and 23b. In various embodiments, the liquid chambers 23a and 23b are formed to have a shape symmetrical about horizontal and vertical axes with the core 21 interposed therebetween, and the flow paths 24a and 24b are formed at both sides of the core 21 along a circumference of the insulator 20 between the liquid chambers 23a and 23b.

The insulator 20 is coupled to the housing 30 having a pipe shape in a state in which a predetermined amount of magnetorheological fluid is encapsulated in the liquid chambers 23a and 23b (for example, the insulator, which is manufactured as illustrated in FIG. 3A, is assembled to the housing in a way that the insulator is fitted with the housing in a state in which the insulator and the housing are submerged in a tank that stores the magnetorheological fluid).

Figure 3B:
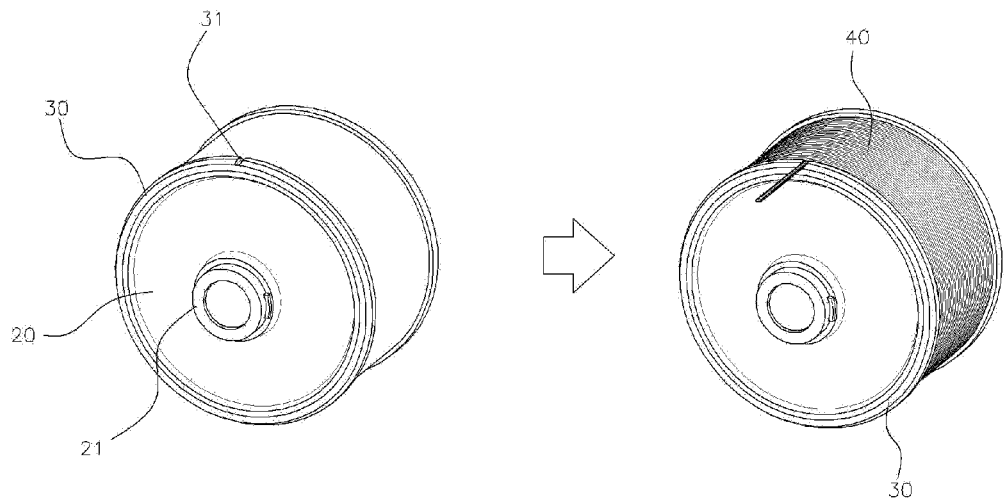
FIG. 3B is a view illustrating an appearance in which a coil is wound around an outer circumferential surface of a housing in a state in which the housing and the insulator are coupled.

As the housing 30 is coupled to the insulator 20, the magnetorheological fluid in the insulator 20 is encapsulated in the insulator 20 in a completely sealed state, and as illustrated in FIG. 3B, the coil 40 is wound around the outer circumferential surface of the housing 30. The housing 30 has a structure in which a groove 31 is formed at a rim of one side thereof so that one or more strands of the coil 40 may be taken out through the groove 31, and both rims of the housing 30 are manufactured to have the same diameter as the outer circumferential surface after the coil 40 is wound (that is, both the rims of the housing are manufactured to have a slightly larger diameter than the outer circumferential surface in consideration of the coil wound around the outer circumferential surface).

Figure 3C:
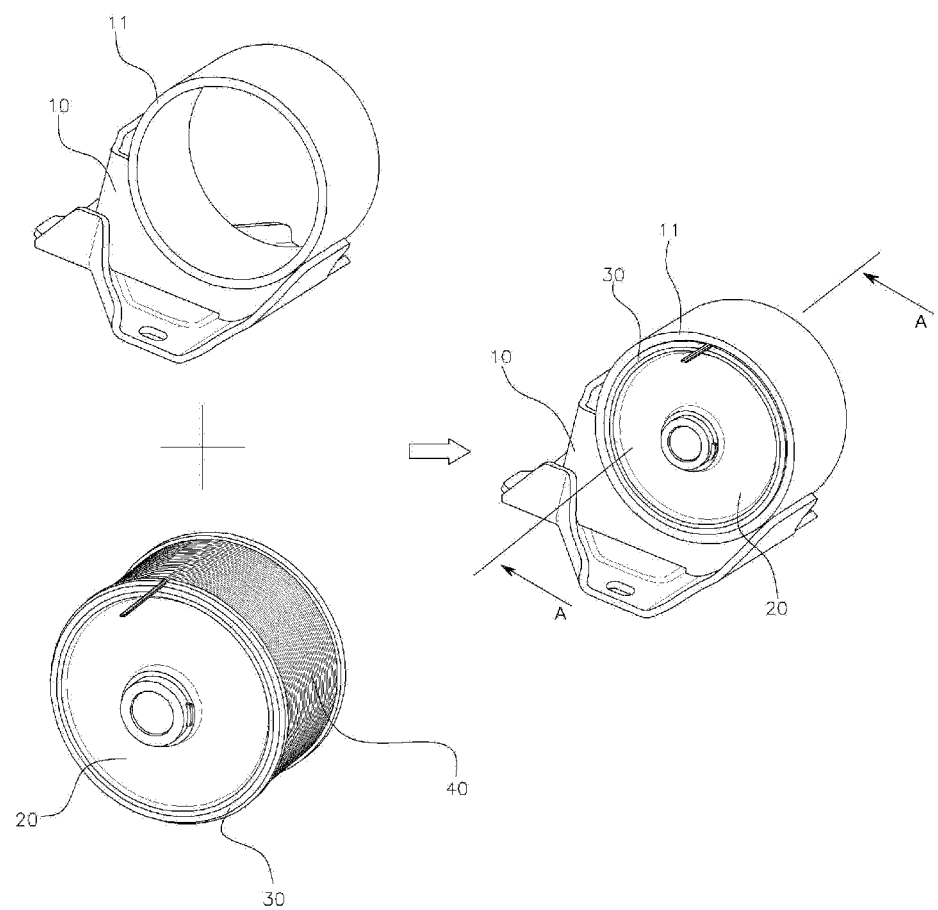
FIG. 3C is a view illustrating an appearance in which an assembly of the insulator and the housing around which the coil is wound as illustrated in FIG. 3B is fitted into a mounting portion of a bracket.

After the insulator 20 is coupled to the housing 30 and the coil 40 is wound, the insulator 20 is finally and completely assembled by being press-fitted into the mounting portion 11 of the bracket 10, as illustrated in FIG. 3C. The bracket 10 of the completed roll mount 100 is fastened to the vehicle body by bolting, and the coil 40 is connected to a power control device.

Figure 4:
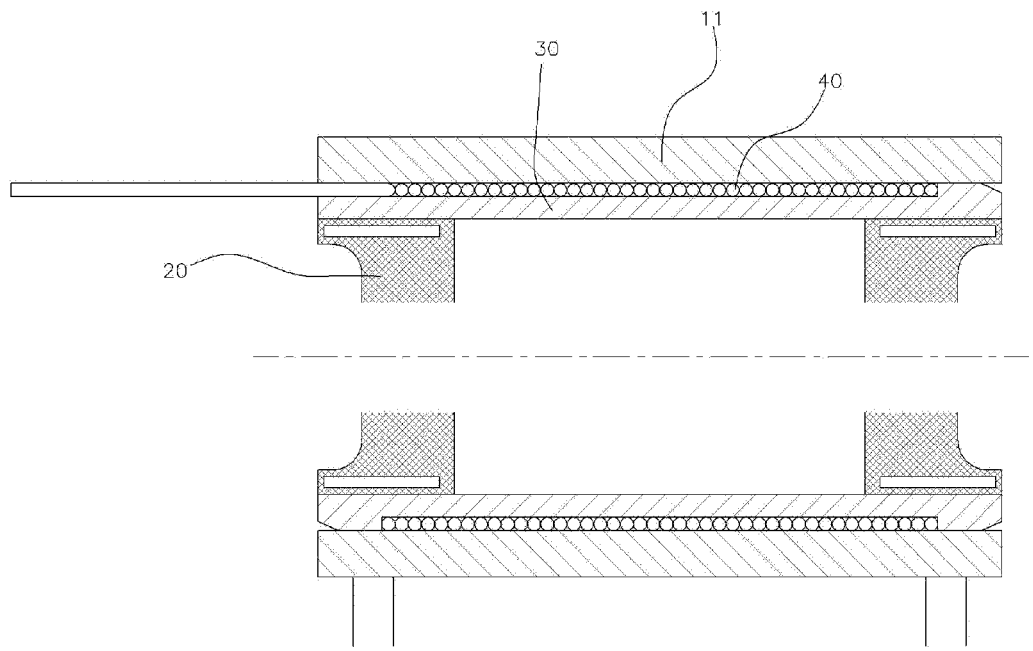
FIG. 4 is a view illustrating a cross-sectional appearance taken along line A-A of FIG. 3C.
Figure 5:
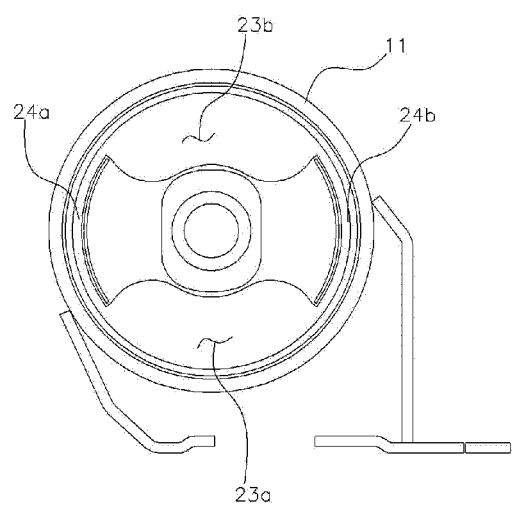
FIG. 5 is a view illustrating an appearance in which the exemplary roll mount is cut out in a direction perpendicular to line A-A of FIG. 3C.

Therefore, as illustrated in FIG. 4 and FIG. 5, the coil 40 may be disposed between the mounting portion 11 and the housing 30 and supplied with an electric current from the outside, and the magnetorheological fluid may be disposed inside the coil 40 and may flow between the liquid chambers 23a and 23b through the flow paths 24a and 24b.

Figure 6:
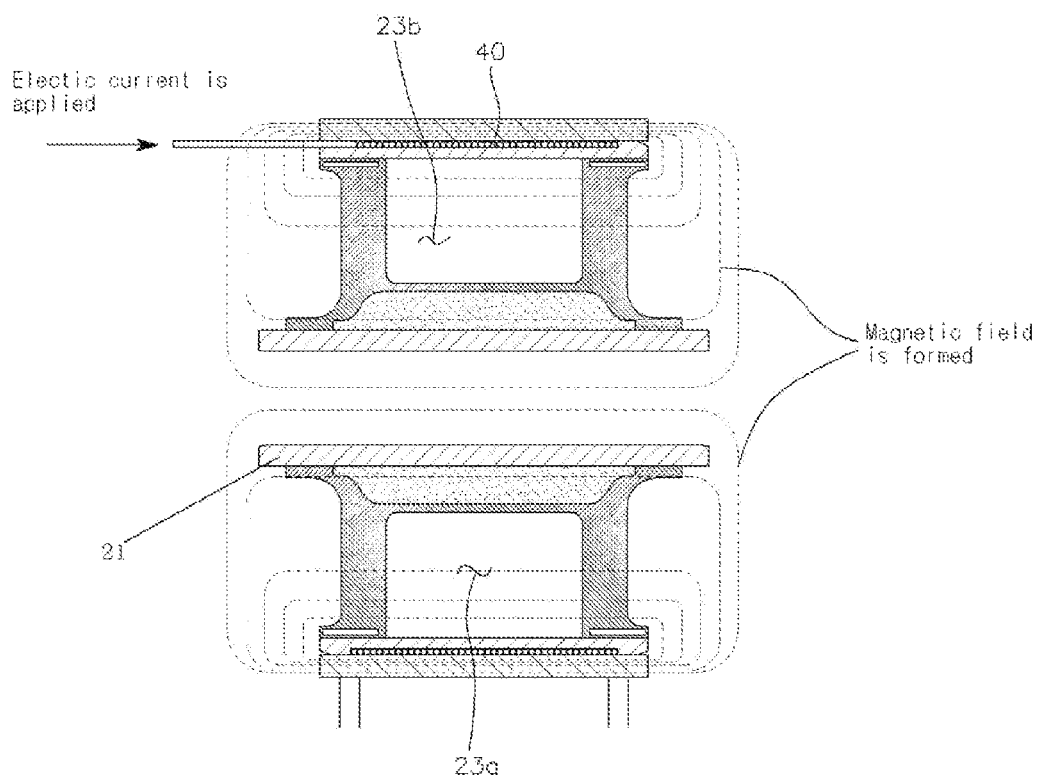
FIG. 6 is a view illustrating an appearance of a magnetic field that is formed at the periphery of a liquid chamber when an electric current is applied.

The magnetorheological fluid, which is encapsulated in a state in which no electric current is applied, attenuates vibration while flowing between the liquid chambers 23a and 23b like a typical fluid by elastic deformation of the insulator 20 (in a state in which damping characteristics are decreased). Further, as an electric current is applied and an amount of electric current is increased, a magnetic field is formed at the periphery of the coil 40 as illustrated in FIG. 6, and shear stress of the magnetorheological fluid is increased (damping characteristics are increased), thereby more securely supporting the behavior of the powertrain.

That is, the roll mount 100 of the present invention does not apply an electric current when the vehicle is idling, thereby improving NVH performance. Further, when an electric current is applied to the coil 40 when the vehicle starts moving or depending on a traveling state, shear stress of the magnetorheological fluid is increased, and a flow rate is reduced or a flow is blocked, thereby inhibiting rolling motion of the powertrain.

For reference, an amount of electric current applied to the coil 40 is determined depending on a traveling condition of the vehicle by predetermined logic, and a flow direction of the particles in the magnetorheological fluid forms a right angle with respect to a direction in which the magnetic field is formed, in order to improve efficiency in controlling a flow of the magnetorheological fluid.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roll mount using a magnetorheological fluid, the roll mount comprising:
    a bracket which has a mounting portion having a pipe shape;
    an insulator made of an elastic material and fitted into the mounting portion, the insulator having therein two liquid chambers that are in communication with each other through flow paths and having a core coupled to a center thereof; and
    a coil which is wound around an outside of the insulator,
    wherein a magnetorheological fluid is encapsulated in the liquid chambers, the magnetorheological fluid flows while the insulator is elastically deformed by a load applied to the core, and a flow rate of the magnetorheological fluid is adjusted depending on an amount of electric current applied to the coil,
    wherein a groove is formed in a metallic housing so that at least one strands of the coil wound on the metallic housing are taken out toward a side.

2. The roll mount of claim 1, wherein the insulator is fitted into the metallic housing and mounted on the bracket, and the coil is wound around an outer circumferential surface of the housing.

3. The roll mount of claim 2, wherein the liquid chambers are positioned at both sides of the core interposed therebetween.

4. The roll mount of claim 1, wherein the liquid chambers are positioned at both sides of the core interposed therebetween.

5. The roll mount of claim 1, wherein the flow paths are formed at both sides along a circumference of an inner circumferential surface of the insulator between the liquid chambers.

6. The roll mount of claim 1, wherein the liquid chambers are positioned at both sides of the core interposed therebetween.

* * * * *